Patented Sept. 17, 1940

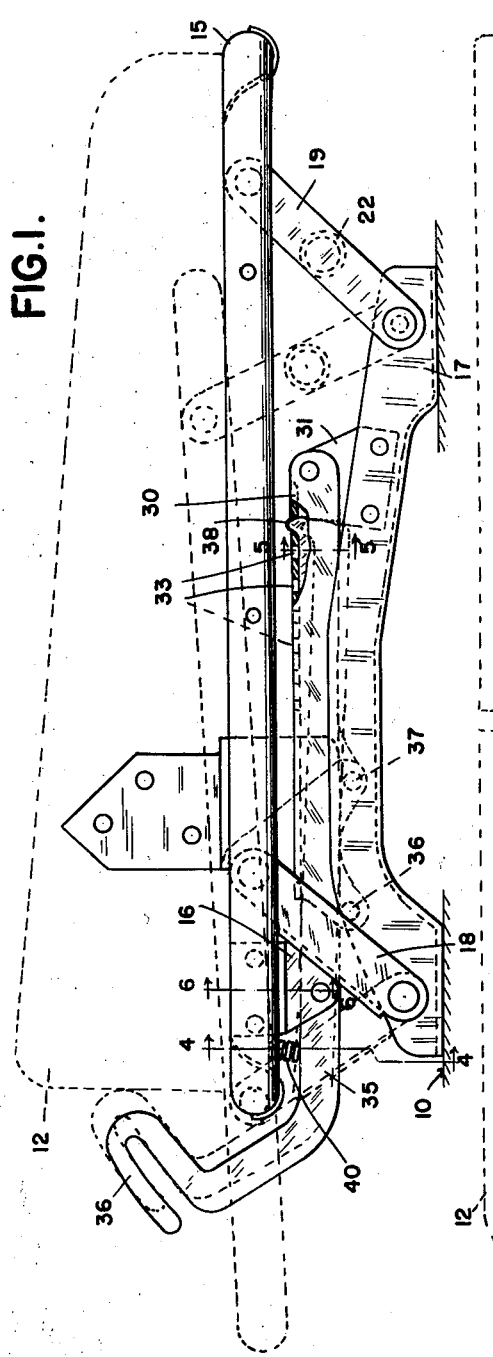

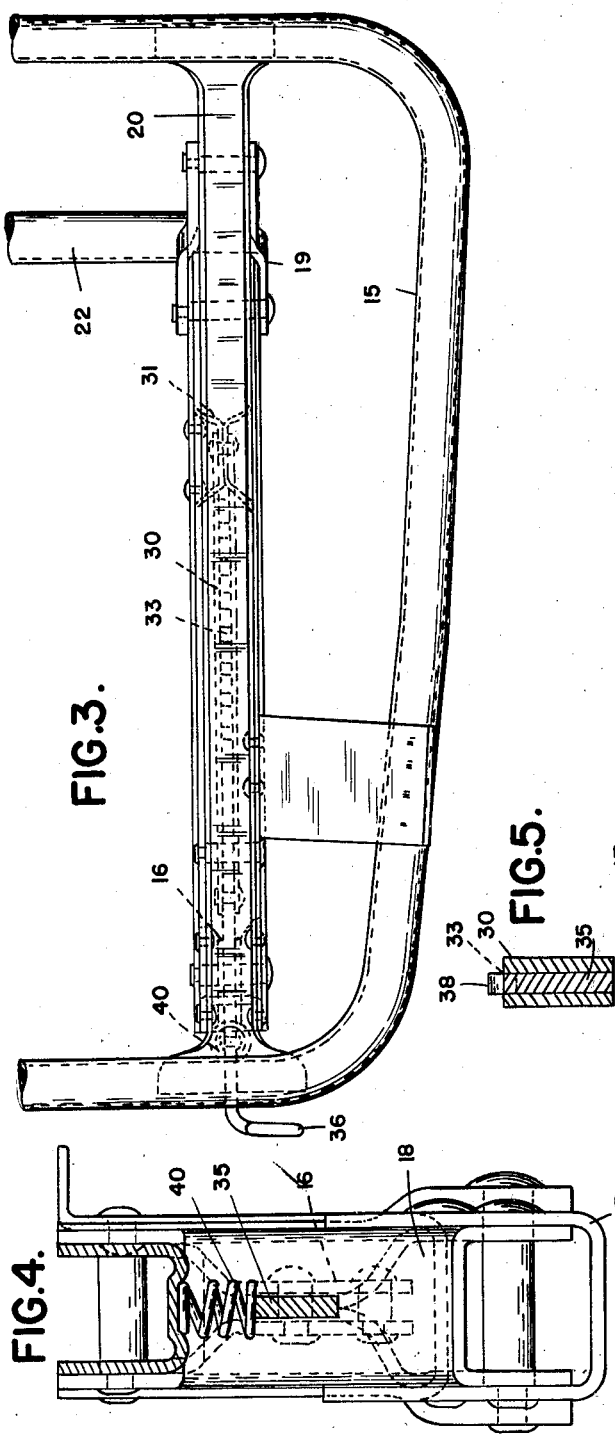
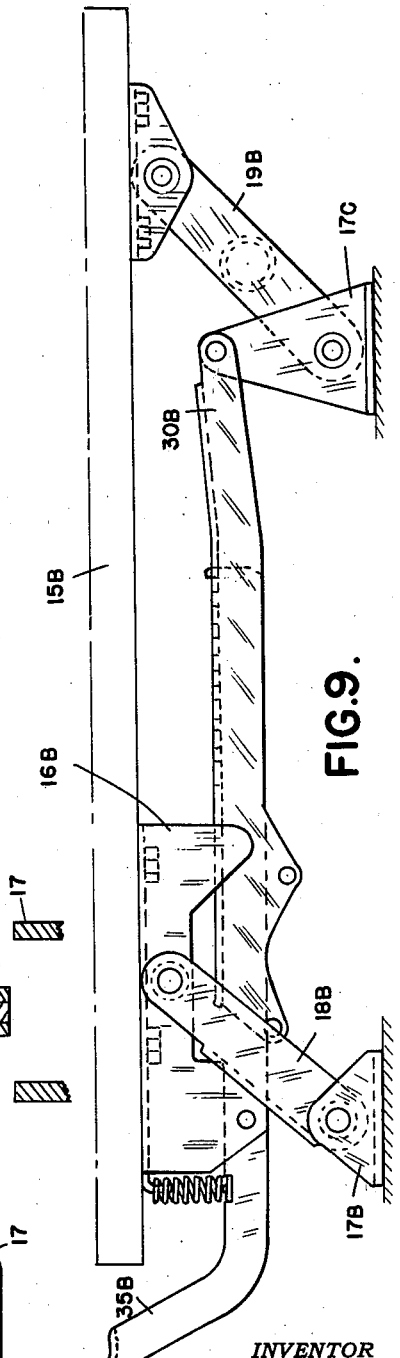

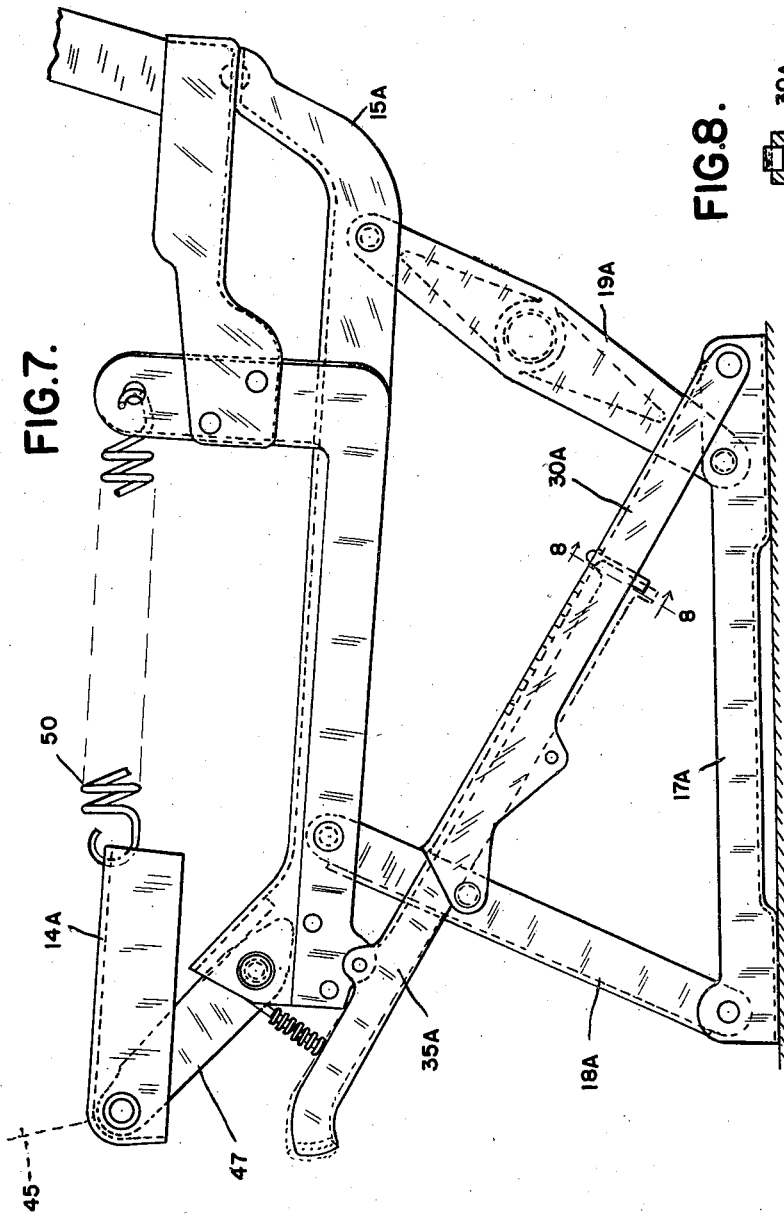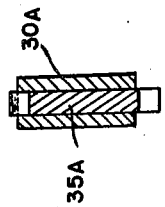

2,215,012

UNITED STATES PATENT OFFICE 2,215,012

ADJUSTABLE SUPPORT AND LOCKING MEANS THEREFOR

Thomas A. McGregor, Pontiac, Mich., assignor to American Forging & Socket Company, Pontiac, Mich., a corporation of Michigan Application August 15, 1938, Serial No. 224,943

2 Claims. (Cl. 155—14)

This invention relates to adjustable supporting devices, particularly for seats of the character used in motor cars and other vehicles, and aims to provide a simplified, inexpensive, and very rugged mechanism whereby a seat or other supported object may be firmly mounted, and normally held against all unwanted movement, rattling or lost motion, yet which provides means whereby the seat or supported object may be very easily released and moved to different positions, to suit the convenience and comfort of the occupant or occupants.

An important object of the invention is to provide improved locking means, especially adaptable to supporting mechanisms of that class which allow adjustment of both the height and longitudinal position of the seat, for holding the seat against movement in any direction, while allowing the seat to be freed for adjustment both in height and longitudinal position by a single movement of a releasing handle.

In seat supporting devices of that class employing a plurality of links, pivoted at their lower ends to a floor and at their upper ends to a seat frame to carry the latter, difficulty has arisen in providing locking means of a strong, positive and easily operable nature, which is not too expensive to be practicable in view of the limited amount of money allocable to such mechanisms in quantity production of automobiles, for example. The present invention aims to provide improved locking means particularly adaptable to seat supporting mechanisms of the link type, of stronger, more positive, cheaper and more easily operable nature than previous known locking means for this purpose.

Other objects and advantages will be apparent from the following description, wherein reference is made to the accompanying drawings illustrating preferred embodiments of my invention and wherein similar reference numerals designate similar parts throughout the several views.

In the drawings:

Figure 1 is a side elevational view of a seat supporting mechanism constructed in accordance with the present invention.

Figure 2 is a front elevational view thereof.

Figure 3 is a plan view of one end thereof.

Figures 4, 5, and 6 are vertical sectional views taken substantially on the lines 4—4, 5—5, and 6—6 respectively of Figure 1, looking in the direction of the arrows.

Figure 7 is a view similar to Figure 1 of a somewhat modified construction.

Figure 8 is a sectional detail taken substantially on the line 8—8 of Figure 7, looking in the direction of the arrows.

Figure 9 is a view similar to Figure 1 of another somewhat modified embodiment.

Referring now to the drawings, and particularly to Figures 1 to 6, inclusive, in which reference character 10 designates a floor, and 12 designates a cushioned seat of the type commonly used in motorcars, it will be seen that the seat frame 15, formed of tubing bent to a suitable generally rectangular outline, is supported from floor brackets 17, 17A by means of links 18, 19, pivoted at their lower ends to the floor brackets and at their upper ends to cross cars 20 carried by the frame. This arrangement generally acts as parallelogram-type linkage. A relatively stiff tube 22 extends between and is welded at its ends to the two rear links 19 at opposite ends of the seat, forming a torque transmitting member to insure uniform swinging movement of both ends of the seat.

To hold the seat against movement, a locking assembly is provided consisting of an inverted channeled arm 30, pivoted at its rear end upon a small bracket plate 31 attached to floor bracket 17. The lock channel acts as a keeper, and extends forwardly in a plane generally parallel to that in which the supporting links swing. The bight portion of the channel is serially perforated as at 33. A second arm 35, which acts as a bolt or detent, is pivoted on a bracket 16 attached to the seat frame and slidable and rockable in the channeled keeper arm 30. At its forward end the detent arm extends outwardly and upwardly to carry an integral handle portion 36, positioned for convenient manipulation by an occupant of the seat, while at its rear end an upwardly projecting detent lug 38 is projectible into and normally held in engagement with one of the apertures 33 of the keeper arm.

The keeper channel 30 is free at its forward end to swing vertically, and supported only by the locking lever 35, the rear end of which is urged upwardly by a compression spring 40 bearing downwardly upon it at a point forward of its pivotal mounting in bracket 16. Spring 40 is of sufficient strength to maintain the locking arm and channel 30 in raised position, and to force the detent lug 38 into whichever of the holes 33 it may be in line with.

When the handle is lifted, to swing rear end of the locking lever downwardly, the front end of the keeper channel falls and the detent lug 38 is swung downwardly out of engagement with the apertures 33. Thereafter the seat may be moved freely toward the front or rear on the supporting linkage, and the locking arm slides in the keeper channel. A spacer rivet 36 extending between the side webs of the keeper channel near its front end is engageable by the locking lever when the latter is forced downwardly in this manner, and serves as positive actuating means to depress the forward end of the keeper channel. A second spacer rivet 37 extending between the side webs of the channel farther to the rear limits downward movement of the locking arm and channel when so actuated.

In the somewhat modified construction shown in Figure 7, in which parts equivalent to those already described have been given like reference characters, distinguished by the addition of the letter "A" to each, many parts will be seen to be so similar that no detailed redescription thereof is required. The floor rail 17A similarly carries front and rear supporting links 18A, 19A, which in turn support the seat frame 15A. The latter is formed of angle iron and mounted somewhat higher, by reason of the greater length of supporting links. This will be seen to enable the disposition of the locking assembly 30A, 35A at such an angle that it effectively braces the seat against movement when locked. The operation of the locking parts will be seen to be virtually the same, and to need no re-explanation.

A forward section 14A of the seat frame, upon which the front edge of the seat cushion 45 is directly carried, is movable independently of the remainder of the seat frame, being connected at its ends thereto by supporting links 47 in such manner that it may move forwardly and downwardly, against the effort of springs as 50, which tend to pull it to the rear and upwardly. This arrangement allows the use of seat cushion springs which are longitudinally extensible, without the uncomfortable rigid forward rail usually present when such cushion springs are used. Since the front rail portion 14A, in my improved construction may yield under loading, it is resilient, and as comfortable as the remainder of the seat.

The modification shown in Figure 9 also corresponds generally to the construction first described, so that a description of the differences will suffice.

Independent floor brackets 17B, 17C are provided for pivotal support of the links 18B, 19B which carry the seat frame 15B. The keeper portion 30B of the locking assembly is pivoted to an upward extension of one of the rear floor brackets, 17C, while the detent lever 35B is pivotally mounted in a bracket 16B carried in similar fashion by the underside of the seat frame and serving also as a fulcrum plate for the upper end of one of the forward links 18B. This arrangement will be seen to allow the locking assembly to extend horizontally at a level just below that of the seat frame, thereby holding such frame most effectively against longitudinal movement.

I am aware that the invention may be embodied in other specific forms without departing from the spirit or essential attributes thereof, and I therefore desire the present embodiments to be considered in all respects as illustrative and not restrictive, reference being had to the appended claims rather than to the foregoing description to indicate the scope of the invention.

What I claim is:

1. In combination with a suitable support and means for movably attaching a desired object thereto, locking means for releasably holding such object against unwanted movement comprising a pair of slidably interfitted locking members, one pivotally attached to such object and the other to the support, whereby said members are rockable with respect to each other, interengageable holding portions carried partly by one of said members and partly by the other and selectively engageable and disengageable by such rocking movement of one of said members with respect to the other, one of said members being slidable within the other with movement of the supported object, said holding portions normally preventing such sliding movement and preventing movement of the supported object, one of said portions comprising a tooth carried by the interfitted end of one of said members, the other member having serially disposed perforations selectively engageable by such tooth, and means carried by the other member near its end for transmitting rocking motion from one to the other of said members.

2. In combination with a suitable support and means for attaching a desired object thereto, locking means for releasably holding such object against unwanted movement comprising a pair of slidably interfitted locking members, one pivotally attached to such object and the other to the support, said members also being rockable with respect to each other, interengageable holding portions carried partly by one of said members and partly by the other and selectively engageable and disengageable by such rocking movement of one of said members with respect to the other, said holding portions being so aligned with relation to each other and to said members as to be movable to engaged relation when said locking members are moved to substantially rectilinear relation, and disengageable by movement of said locking members to angular relation.

THOMAS A. McGREGOR.